United States Patent
Abitrabi et al.

(10) Patent No.: US 9,423,526 B2
(45) Date of Patent: Aug. 23, 2016

(54) METHODS FOR ESTIMATING MISSING REAL-TIME DATA FOR INTELLIGENT FIELDS

(71) Applicant: Saudi Arabian Oil Company, Dhahran (SA)

(72) Inventors: Abdel Nasser Abitrabi, Dhahran (SA); Fahad Al-Ajmi, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 520 days.

(21) Appl. No.: 13/889,126

(22) Filed: May 7, 2013

(65) Prior Publication Data

US 2013/0253837 A1 Sep. 26, 2013

Related U.S. Application Data

(63) Continuation-in-part of application No. 13/731,238, filed on Dec. 31, 2012, and a continuation-in-part of application No. 13/731,257, filed on Dec. 31, 2012.

(60) Provisional application No. 61/698,275, filed on Sep. 7, 2012, provisional application No. 61/582,350, filed on Dec. 31, 2011.

(51) Int. Cl.
| | |
|---|---|
| *G06F 11/00* | (2006.01) |
| *G01V 13/00* | (2006.01) |
| *G01V 9/00* | (2006.01) |
| *E21B 47/00* | (2012.01) |
| *G01V 9/02* | (2006.01) |

(52) U.S. Cl.
CPC .............. *G01V 13/00* (2013.01); *E21B 47/00* (2013.01); *G01V 9/005* (2013.01); *G01V 9/02* (2013.01)

(58) Field of Classification Search
CPC .. G06Q 10/06; G06Q 10/063; G06Q 10/0637
USPC .............................. 702/12, 14, 182–185, 188
See application file for complete search history.

(56) References Cited

U.S. PATENT DOCUMENTS

| | | | |
|---|---|---|---|
| 5,934,371 A | 8/1999 | Bussear et al. | |
| 5,960,369 A | 9/1999 | Samaroo | |
| 6,430,547 B1 | 8/2002 | Busche | |
| 6,450,002 B1 | 9/2002 | Smith | |
| 6,804,600 B1 | 10/2004 | Uluyol | |
| 6,873,267 B1 | 3/2005 | Tubel et al. | |
| 7,349,960 B1 * | 3/2008 | Pothier ............. | G06F 17/30539 709/223 |

(Continued)

FOREIGN PATENT DOCUMENTS

| | | |
|---|---|---|
| WO | WO0123705 A1 | 4/2001 |
| WO | 0148571 A1 | 7/2001 |
| WO | 2008104750 A1 | 9/2008 |

OTHER PUBLICATIONS

International Search Report and Written Opinion for Related PCT Application PCT/US2013/057989, dated Dec. 20, 2013.

*Primary Examiner* — Edward Raymond
(74) *Attorney, Agent, or Firm* — Bracewell LLP; Constance Gall Rhebergen; Brad Y. Chin

(57) ABSTRACT

Methods for managing an intelligent field, are provided. An exemplary method can include, for example, the steps of receiving well instrument data, processing the data, detecting a missing or faulty data period, applying a rule set and logics, estimating values for the missing or faulty data, validating the estimated values, and inserting the data in the data period.

23 Claims, 3 Drawing Sheets

(56) References Cited

U.S. PATENT DOCUMENTS

| | | |
|---|---|---|
| 7,672,825 B2 | 3/2010 | Brouwer et al. |
| 2008/0154510 A1 | 6/2008 | Scott |
| 2008/0270328 A1 | 10/2008 | Lafferty |
| 2009/0254325 A1 | 10/2009 | Gokdemir et al. |
| 2009/0276100 A1 | 11/2009 | Malki et al. |
| 2009/0319307 A1 | 12/2009 | Carlson |
| 2010/0050017 A1 | 2/2010 | Almadi et al. |
| 2010/0076740 A1 | 3/2010 | Kuchuk et al. |
| 2010/0247335 A1 | 9/2010 | Atherton |
| 2010/0332175 A1 | 12/2010 | Marsh |
| 2011/0098931 A1 | 4/2011 | Kosmala |

* cited by examiner

FIG. 3.

METHODS FOR ESTIMATING MISSING REAL-TIME DATA FOR INTELLIGENT FIELDS

RELATED APPLICATIONS

This application is a non-provisional of and claims priority to and the benefit of U.S. Provisional Application No. 61/698,275, filed on Sep. 7, 2012, and is a continuation-in-part of U.S. Non-Provisional application Ser. No. 13/731,238, filed on Dec. 31, 2012, titled Real-Time Dynamic Data Validation Methods for Intelligent Fields and U.S. Non-Provisional application Ser. No. 13/731,257, filed on Dec. 31, 2012, titled "Real-Time Dynamic Data Validation Apparatus and Computer Readable Media for Intelligent Fields," which claimed priority to and the benefit of U.S. Patent App. No. 61/582,350, filed on Dec. 31, 2011, titled "Real-Time Dynamic Data Validation Methods for Intelligent Fields," and is related to U.S. Non-Provisional application Ser. No. 13/889,136, filed on May 7, 2013, titled Apparatus, Computer Readable Media, and Computer Programs For Estimating Missing Real-Time Data for Intelligent Fields, each incorporated by reference in its entirety.

BACKGROUND OF THE INVENTION

1. Field of the Invention

The present invention relates generally to the oil and gas industry, particularly reservoir management, more particularly to methods, apparatus, systems, computer readable medium, and computer program code for managing an intelligent field, and more specifically to methods, apparatus, systems, computer readable media, and computer program code for detecting faulty data, estimating values for the faulty data, and performing a data substitution.

2. Description of the Related Art

Advances in technology continue to have a great impact on the petroleum industry. Within the past 20 years, many technologies have transformed the way oil and gas companies manage and/or optimize their operations. One such technology includes permanent downhole monitoring systems (PDHMS), which were introduced over 20 years ago. A PDHMS surface unit typically is used to collect subsurface sensor performance data, i.e., pressure and temperature gauges. Other technologies include, for example, multiphase flow meters (MPFMs) which provide individual flow rates for oil, gas, and water in a producing well, wellhead pressure and temperature (WHP/T) measurement devices which provide measured wellhead pressure and temperature, tubing/casing annulus (TCA) pressure measuring devices, and electrical submersible pump (ESP) devices for assisting the oil to the surface, which provide measurable electrical and pump parameters.

Early installations were often in the form of self-contained devices having removable modules. Some more conventional configurations include wire or fiber-optic connection, which communicate the data to surface-based units. Others include a network topography which provides such data between the various sensors and the surface-based units.

Initial methodologies of transferring the data received by the surface-based units to a central computer or monitoring station included use of physical transport and/or transmission over land-based wire lines. More recent technologies employed by the assignee of the respective invention or inventions include utilization of radiowave well data monitoring which can include individual well transmitters that transmit to a remote terminal unit (RTU) that sends the data by UHF radio to an information server or SCADA system, which can then migrate the data over a local communication network to desktops of production engineers. An exemplary system is described, for example, in U.S. patent application Ser. No. 12/547,295, titled: "Intelligent Field Oil and Gas Field Data Acquisition, Delivery, Control, and Retention Based Apparatus, Program Product and Related Methods," incorporated by reference in its entirety. Similar technologies include utilization of global satellite mobile or cellular telephone based communication, which have generally been employed as a backup to provide alerts. Such technologies of remote monitoring of field data can provide the wellhead pressure, wellhead temperature, downhole pressure, downhole temperature, annuli pressures, fluid flow rate for individual fluid phases, and electrical submersible pump data, among others, both in real-time and on demand, to allow centralized well control.

The field data, however, can be unreliable, e.g., outside the boundaries of valid data. The field data can also be invalid, e.g., within the boundaries of valid data but substantially deviating from expected data values based on given conditions. The field data can also be incomplete, e.g., a data stream can have gaps or periods of missing data. The field data can also be missing as a result of being completely interrupted.

SUMMARY OF THE INVENTION

Recognized by the inventors, therefore, is the need for apparatus, systems, program code/computer readable medium, and methods to identify and process unreliable data, to identify and process invalid data, and/or to locate or highlight missing data periods in otherwise incomplete data, to generate a stream of replacement data, and to substitute the replacement data for the unreliable, invalid, or incomplete data to effectively and proactively manage well performance in an intelligent field.

In view of the foregoing, various embodiments of the present invention advantageously provide apparatus, systems, program code/computer readable medium, and methods of managing an intelligent field, which provide for detecting, estimating, and compensating for missing, unreliable, or invalid data using a set of reservoir management and production rules and/or engineering logics, where missing data is the data that would have been collected in a region of well real time data where there is a gap. The methodology can apply artificial intelligence and mathematical models to estimate, in real time, missing data from a substantial plurality, if not all, field components in the intelligent field. This methodology can provide real time dynamic data substitution for the various intelligent field components such as, for example, a multiphase flow meter MPFM (e.g., oil, gas and water), well head pressure/temperature sensor/device, bottom hole pressure/temperature sensor/device, etc., in case of a malfunction of the component, and to cease doing so after resumption of the transmission of reliable, valid, and substantially complete data.

Various embodiments of the present invention advantageously provide apparatus, systems, computer program/computer readable medium, and several methods for managing an intelligent field, termed "WDestimator" which executes various functions to include estimating data values at least substantially real-time for faulty I-field components based upon observed substantially real-time well component data values of at least two other of the plurality of well components, and performing real-time dynamic data substitution to provide a substantially continuous stream of valid and reliable well component data values for the I-field components, described below.

According to an exemplary embodiment of a method for managing an intelligent field, the method steps can include receiving at least substantially real-time dynamic field data for an intelligent field system. The received data can include at least substantially real-time field data, but more typically, real-time streaming field data with a negligible delay for each of a plurality of well instruments for each of a plurality of wells. The steps can also include analyzing the reliability, validity, and completeness of the streaming data for each of the well instruments and detecting faulty data comprising missing data, invalid data, and/or unreliable data for a faulty well instrument. Missing data is typically of the form of either completely interrupted data stream or gaps in what otherwise would be termed incomplete data. The steps can further include estimating data values at least substantially real-time for the faulty well instrument based upon observed substantially real-time well instrument data values of at least two other of the plurality of well instruments, and performing real-time dynamic data substitution responsive to the steps of detecting and estimating to thereby provide a substantially continuous stream of valid and reliable well instrument data values for the faulty well instrument.

Various embodiments of the present invention also include apparatus for managing intelligent field. According to the exemplary embodiment, the apparatus includes a plurality of hydrocarbon well instruments. The well instruments data can include a permanent downhole monitoring system (PDHMS), a multiphase flow meter (MPFM), a wellhead pressure (WHP) and wellhead temperature (WHT) measurement device, a tubing or casing annulus (TCA) pressure measurement, and optionally, an electrical submersible pump (ESP) when required or otherwise desired. The apparatus can also include a supervisory control and data acquisition (SCADA) system for an intelligent hydrocarbon recovery field system operably coupled to the plurality of well instruments to receive data therefrom. The apparatus can also include a process integration (PI) server for the intelligent field system operably coupled to the SCADA system to receive data therefrom. The apparatus can also include a dynamic field data maintenance computer operably coupled to the PI server to receive data therefrom. The apparatus can also include dynamic field data maintenance computer program stored in the memory of the dynamic field data maintenance computer and/or deliverable on a standalone computer readable medium.

The dynamic field data maintenance computer program can include instructions that when executed by the dynamic field data maintenance computer (i.e., one or more processors associated therewith), cause the computer to perform various operations to provide a substantially continuous stream of valid and reliable well instrument data values for a faulty well instrument. The operations can include receiving at least substantially real-time dynamic field data for an intelligent field system, analyzing the reliability, validity, and completeness of the received data for each of the well instruments and detecting faulty data comprising missing data, invalid data, and/or unreliable data for a faulty well instrument or multiple faulty well instruments. For each faulty well instrument, the operations can further include estimating data values at least substantially real-time for the faulty well instrument based upon observed substantially real-time well instrument data values of at least two other of the plurality of well instruments, and performing real-time dynamic data substitution responsive to the operations of detecting and estimating to thereby provide the substantially continuous stream of valid and reliable well instrument data values for the faulty well instrument.

Various embodiments of the present invention advantageously provide a system/apparatus that has the capacity to monitor, and proactively detect, any anomalies from oil and water injector wells, as captured by real-time data. Various embodiments can effectively manage well productivity in case any intelligent field component malfunctions and compensate for missing data in case any intelligent field components experience any data transmission issues, ensuring data is available at engineer desktop to thereby keep performing its task in order to meet the ultimate objective of reservoir management through effective decision making. Various embodiments advantageously ensure proper intelligent field component calibration in conjunction with the provision of continuous reliable, valid, and complete data. Various embodiments also provide for the avoidance of early water breakthrough or producing below the bubble point in case any intelligent field component malfunctions. Various embodiments employ a methodology which utilizes engineering logic and mathematical models built to detect, validate, and substitute missing data due to the malfunction of an intelligent field component, and which employs clear processes and workflows. Various embodiments detect anomalies and expedite remedial actions of intelligent field components to ensure the provision of valid data at the engineering desktop. According to various embodiments, a system and/or apparatus is provided which has the capacity to monitor and proactively detect, any anomalies from oil and water injector wells, as captured by real-time data. Various other advantages are described below in conjunction with a more detailed description of various exemplary embodiments and configurations of the present invention.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 3 is a graph illustrating application of various logics to certain parameters associated with faulty data in oil-producing and injection wells according to an embodiment of the present invention.

DETAILED DESCRIPTION

Figure 1:
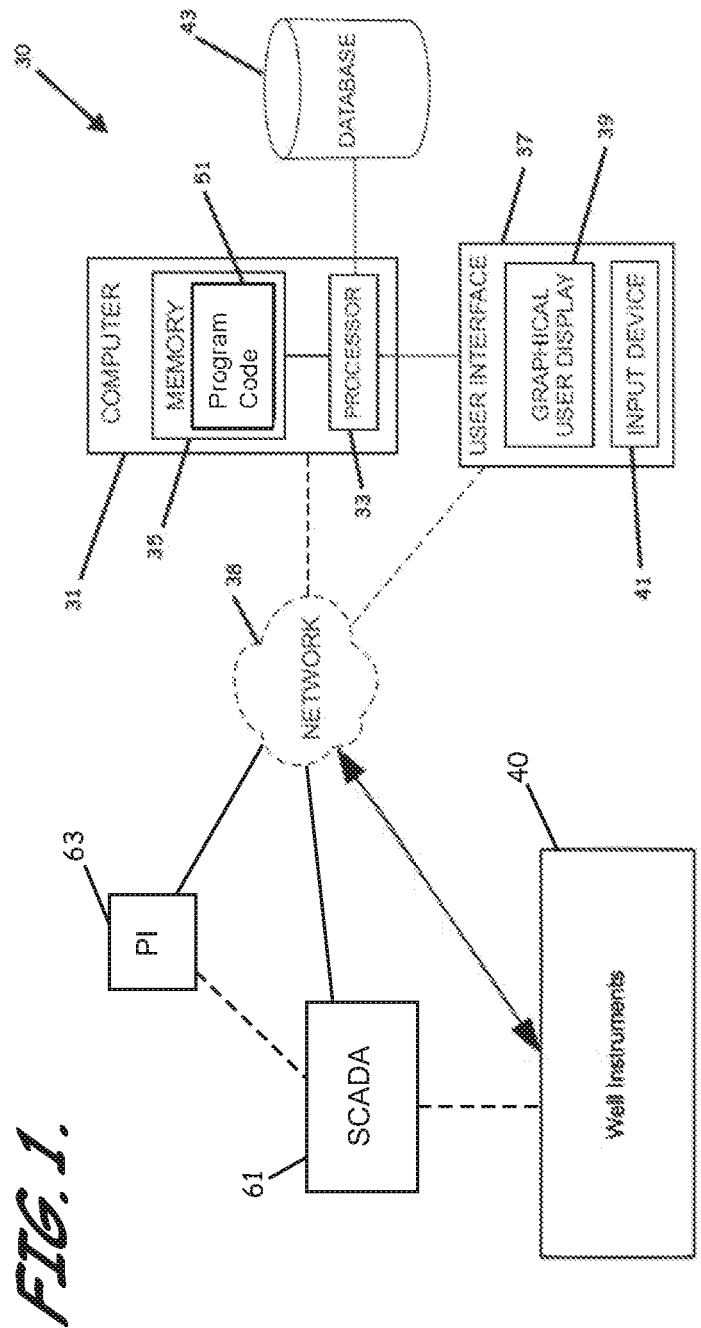
FIG. 1 is a schematic diagram of a general architecture of an apparatus for managing an intelligent field according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Ensuring the flow of reliable, valid, and complete real-time data from the various intelligent field (I-field) components to engineers' desktop is a vital process to efficiently utilize real-time data in field management. Various apparatus, systems, computer program/computer readable medium, and methods for monitoring the reliability of key performance indicators in intelligent oil fields, termed "WDEye," are described, for example, in U.S. Patent App. No. 61/561,541 filed Nov. 18, 2011, incorporated herein by reference in its entirety. Various apparatus, systems, computer program/computer readable medium, and several methods for providing/applying real-time dynamic data validation, advanced anomaly detection, and correct equipment calibration specification/recommendations for I-field components, termed "WDvalidation," are described, for example, in U.S. Patent App. No. 61/582,350, filed on Dec. 31, 2011, also incorporated herein by reference in its entirety.

Various embodiments of the present invention utilize WDeye and WDvalidation and smart real time data reliability systems to detect any missing or bad data for any of the intelligent field component. Once missing data is highlighted, then various components of the present invention termed "WDestimator" can apply multiple engineering logics, estimating and allocating the missing value(s). WDestimator includes a methodology that can employ multiple processes and engineering logics to perform real time dynamic data estimation and substitution to ensure data remains flowing to engineers' desktops in the case of equipment mal-calibrations or malfunctioning issues for any intelligent field.

Before WDestimator, there was no procedure for compensating for missing data (data gaps in incomplete data) resulting from a malfunctioning intelligent field component, and no proactive actions were taken to avoid jeopardizing well productivity or early water breakthrough in case reliable, valid, and complete real time data stopped flowing to engineers' desktops.

Various embodiments of WDestimator employ multiple reservoir management and production engineering logics that can interact with each other and artificial intelligence routines based on mathematical models in order to determine the existence and location of missing or otherwise faulty data from the intelligent field components in an intelligent field. Each logic can have a different effect based upon the data to be substituted or replaced by applying a weight average neural analysis and artificial intelligence to each component of each logic. Artificial intelligence, neural network, and mathematical models can interact, mimic, and generate the missing or otherwise faulty data.

Various embodiments of the present invention provide an automated process of estimating, in real time, the values for MPFM parameters (e.g., oil, water, and gas flow rates), wellhead pressure and temperature (WHP/T) measurements, surface and bottom hole pressures and temperature (BHP/T) measurements, wellhead pressure in an injection well (IWHP), injection rate, fluid gradient, and choke size. Further, various embodiments of the present invention apply a methodology to estimate, in real time, the bottom hole fluid gradient and trending, and a methodology which utilizes the bottom hole fluid gradient to precisely estimate water influx into a well. Various embodiments of the present invention provide real time advance anomalies detection that trigger alerts for immediate action to be taken to ensure, in real time, to ensure optimum well performance.

Additionally, various embodiments of the present invention provide an automated process for estimating, in real time, estimations for a producing well completed with an electrical submersible pump (ESP). The various embodiments of the present invention can incorporate ESP parameters such as, for example, bottom hole dynamic pressure (intake and discharge), electrical parameters (amps), working frequency (hz), FWHP (psi). Utilizing these parameters, a synthetic rate can be estimated. Additionally, various embodiments of the present invention can estimate and incorporate, in real time, the productivity index (PI) and injection index (II).

FIG. 1 illustrates an example of an apparatus 30 for managing an intelligent field through real-time dynamic anomaly detection, real-time estimation of data values to provide substitutes for unreliable, invalid, or missing data, and real-time dynamic data substitution thereof. The apparatus 30 can include a dynamic field data maintenance computer 31 having one or more processors 33, memory 35 coupled to the processors 33 to store software and/or database records therein, and optionally a user interface 37 that can include a graphical display 39 for displaying graphical images, and a user input device 41 as known to those skilled in the art, to provide a user access to manipulate the software and database records. Note, the computer 31 can be in the form of a standalone unit, a component of a well instrument, a personal computer, or in the form of a server or multiple servers serving multiple remotely positioned user interfaces 37. Accordingly, the user interface 37 can be either directly connected to the computer 31 or through a network 38 as known to those skilled in the art. A plurality of well instruments 40 (e.g., intelligent field components) are either in direct coupled communication with the computer 31, for example, via network 38 and/or various other types of media as known to those of ordinary skill in the art. In a less desirable alternative, communication is via manual delivery and unloading.

The apparatus 30 can also include one or more tables and/or databases 43 stored in memory (internal or external) that is operably coupled to the dynamic field data maintenance computer 31, as would be understood by those skilled in the art. The one or more databases 43 can include intelligent field component parameter data for each significant intelligent field component.

The apparatus 30 can also include dynamic field data maintenance computer program 51 provided standalone or stored in memory 35 of the dynamic field data maintenance computer 31. The dynamic field data maintenance computer program 51 can include instructions that when executed by a processor or a computer such as, for example, the dynamic field data maintenance computer 31, cause the computer to perform operations to provide for detecting, validating, and substituting faulty parameter data resulting from a malfunction of well instruments 40 or communication medium therefrom, through utilization of parameter values from other well instruments 40 determined to be providing reliable and valid data. Note, the dynamic field data maintenance computer program 51 can be in the form of microcode, programs, routines, and symbolic languages that provide a specific set or sets of ordered operations that control the functioning of the hardware and direct its operation, as known and understood by those skilled in the art. Note also, the dynamic field data maintenance computer program 51, according to one or more of the embodiments of the present invention, need not reside in its entirety in volatile memory, but can be selectively loaded, as necessary, according to various methodologies as known and understood by those skilled in the art.

Figure 2:
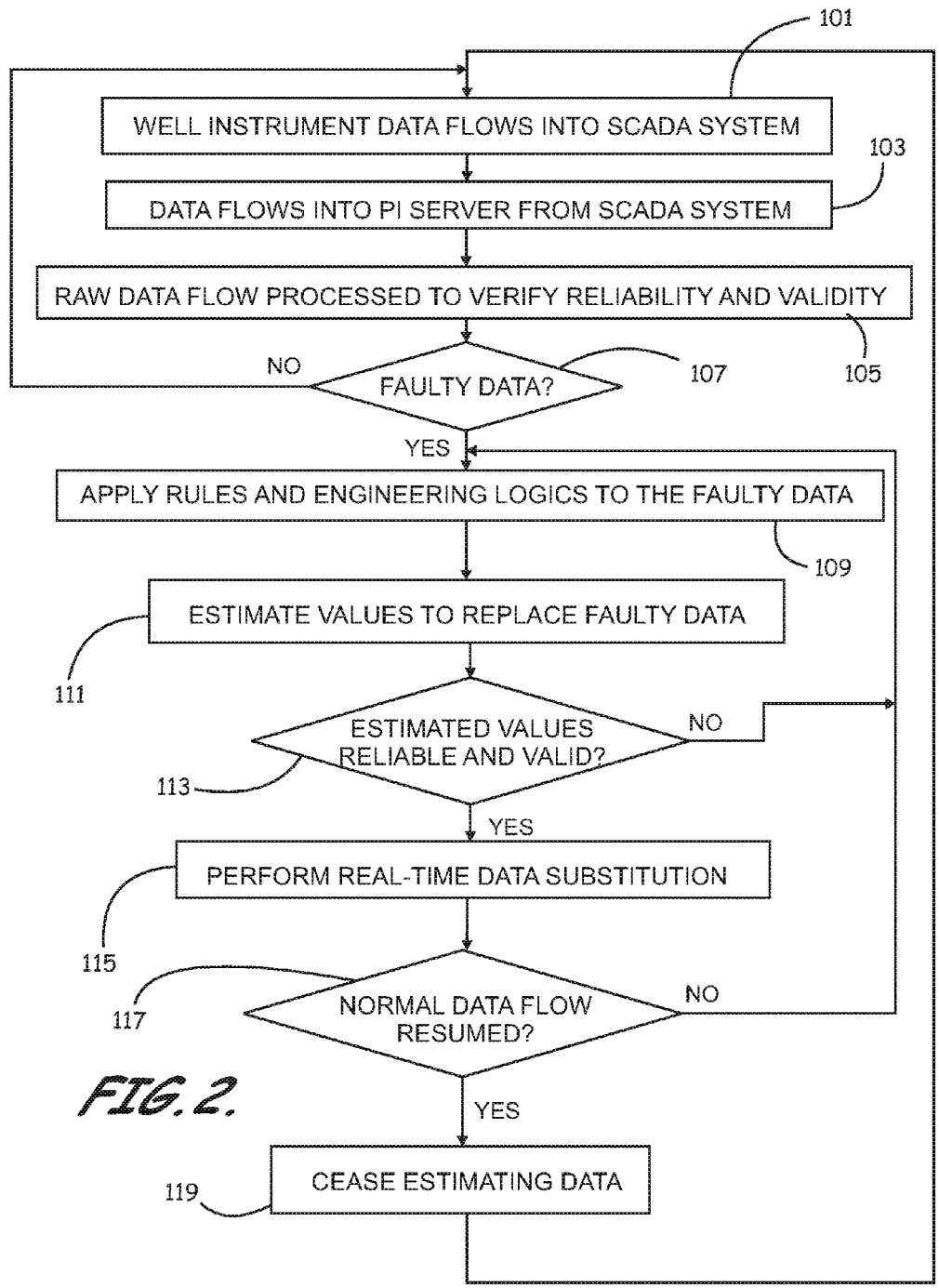
FIG. 2 is a schematic diagram high-level overview of data flow and processing from the attainment of real-time raw/processed data from well instruments to the substitution of reliable, valid, and complete data according to an embodiment of the present invention.

FIG. 2 illustrates a high level flow diagram illustrating method steps and computer program operations for method of managing an intelligent field through the management of well instrument (intelligent field component) data. Initially, real-time well instrument data emanating from well instruments 40 of at least one, but typically multiple wells (not shown), flows into a supervisory and data acquisition (SCADA) system 61 (block 101). The data then flows into a PI Server 63 where it is typically formatted, archived, and made available for distribution (block 103). The PI server 63 can have access to an SQL or other database server or device storing/managing one or more databases 43. The data is then processed, for example, using WDeye and WDvalidation and/or other real-time smart reliability systems (block 105) to detect any unreliable, invalid, and/or missing or incomplete data (block 107), collectively referred to as faulty data.

Once the faulty data is highlighted or otherwise identified, then various components of the present invention termed "WDestimator" can apply multiple engineering logics (block 109) to estimate and allocate values to the missing or otherwise faulty data that falls within the set of potentially reliable and valid data values (block 111). The engineering logics can include, for example, observed real-time or at least substantially real-time well instrument data values of at least one, but more typically, two or more well instruments 40 other than the faulty well instrument 40 producing or providing the faulty data. Artificial intelligence, neural network and mathematical models as understood by those of ordinary skill in the art can be employed to interconnect, mimic and generate the data.

The artificial intelligence can also be used to identify trends and estimate the missing data, generating values by utilizing other intelligent field component values that directly or indirectly impact the missing data. The neural network can be used to cross check as well as capture trends and condition from clusters with similar well conditions. The process can be integrated and missing data can be generated by applying a statistic numerical approach as understood by those of ordinary skill in the art. Note, data that is determined to be unreliable or invalid can be treated as missing data.

The following tables illustrate the active well logic to perform an estimation of the values of faulty data emanating from a well instrument 40 for oil-producing and injection wells. The logic shown in each of the tables includes at least two parameters which have values that are related to the values of the data which should be emanating from the faulty well instrument 40. Note, the weight provided in the tables indicates the weights applied to the parameters according to an exemplary configuration when each of the available parameters listed in the tables according to the exemplary configuration are utilized in the estimation process. These weights are provided by way of example for the exemplary configuration. One of ordinary skill in the art would understand that other embodiments can include various other combinations of parameters and weights. Further, one of ordinary skill in the art would recognize that the weights can be employed to provide a weight average neural analysis and in the application of the artificial intelligence.

Oil Producer Wells:
Oil Rate:

| Parameter/Data | Weight | Minimum number of parameters to be referenced. |
|---|---|---|
| Upstream Pressure | 33% | 2 |
| Wellhead Temperature (WHT) | 33% | |
| Choke size | 33% | |

Oil Rate for Wells Equipped with an Electrical Submersible Pump (ESP):

| Parameter/Data | Weight | Minimum number of parameters to be referenced. |
|---|---|---|
| Upstream Pressure | 25% | 2 |
| Wellhead Temperature (WHT) | 25% | |
| Choke size | 25% | |
| ESP Pump Performance Curve | 25% | |

Water Rate:

| Parameter/Data | Weight | Minimum number of parameters to be referenced. |
|---|---|---|
| Upstream Pressure | 33% | 2 |
| Wellhead Temperature (WHT) | 33% | |
| Fluid gradient | 33% | |

Water Rate for Wells Equipped with an Electrical Submersible Pump (ESP):

| Parameter/Data | Weight | Minimum number of parameters to be referenced. |
|---|---|---|
| Upstream Pressure | 25% | 2 |
| Wellhead Temperature (WHT) | 25% | |
| Fluid gradient | 25% | |
| ESP Pump Performance Curve | 25% | |

Gas Rate:

| Parameter/Data | Weight | Minimum number of parameters to be referenced. |
|---|---|---|
| Upstream Pressure | 50% | 2 |
| Wellhead Temperature (WHT) | 50% | |

Gas Rate for Wells Equipped with an Electrical Submersible Pump (ESP):

| Parameter/Data | Weight | Minimum number of parameters to be referenced. |
|---|---|---|
| Upstream Pressure | 33% | 2 |
| Wellhead Temperature (WHT) | 33% | |
| ESP Pump Performance Curve | 33% | |

Wellhead Temperature (WHT):

| Parameter/Data | Weight | Minimum number of parameters to be referenced. |
|---|---|---|
| Upstream Pressure | 33% | 2 |
| Choke size | 33% | |
| For Wells Equipped with Permanent Down Hole Monitoring System (PDHMS) | | |
| Flowing Bottom Hole Temperature (BHT) | 33% | |

Wellhead Temperature for Wells Equipped with an Electrical Submersible Pump (ESP):

| Parameter/Data | Weight | Minimum number of parameters to be referenced. |
|---|---|---|
| Upstream Pressure | 33% | 2 |
| Choke size | 33% | |
| For Wells Equipped with Permanent Down Hole Monitoring System (PDHMS) | | |
| Flowing Bottom Hole Temperature (BHT) | 33% | |

Wellhead Pressure (WHP):

| Parameter/Data | Weight | Minimum number of parameters to be referenced. |
|---|---|---|
| Wellhead Temperature (WHT) | 33% | 2 |
| Choke size | 33% | |
| For Wells Equipped with Permanent Down Hole Monitoring System (PDHMS) | | |
| Flowing Bottom Hole Temperature (BHT) | 33% | |

Wellhead Pressure for Wells Equipped with an Electrical Submersible Pump (ESP):

| Parameter/Data | Weight | Minimum number of parameters to be referenced. |
|---|---|---|
| Wellhead Temperature (WHT) | 25% | 2 |
| Choke size | 25% | |
| ESP frequency in Hz | 25% | |
| For Wells Equipped with Permanent Down Hole Monitoring System (PDHMS) | | |
| Flowing Bottom Hole Temperature (BHT) | 25% | |

Bottom Hole Pressure (BHP):

| Parameter/Data | Weight | Minimum number of parameters to be referenced. |
|---|---|---|
| Upstream Pressure | 50% | 2 |
| Choke size | 50% | |

Bottom Hole Pressure (BHP) for Wells Equipped with Electrical Submersible Pump ESP):

| Parameter/Data | Weight | Minimum number of parameters to be referenced. |
|---|---|---|
| Upstream Pressure | 50% | 2 |
| Choke size | 50% | |

Bottom Hole Temperature (BHT):

| Parameter/Data | Weight | Minimum number of parameters to be referenced. |
|---|---|---|
| Upstream Pressure | 50% | 2 |
| Wellhead Temperature (WHT) | 50% | |

Bottom Hole Temperature (BHT) for Wells Equipped with Electrical Submersible Pump (ESP):

| Parameter/Data | Weight | Minimum number of parameters to be referenced. |
|---|---|---|
| Upstream Pressure | 33% | 2 |
| Wellhead Temperature (WHT) | 33% | |
| ESP frequency in Hz | 33% | |

Injector Wells:
Wellhead Pressure (IWHP):

| Parameter/Data | Weight | Minimum number of parameters to be referenced. |
|---|---|---|
| Wellhead Temperature (WHT) | 50% | |
| Choke size | 50% | |

Wellhead Pressure for Wells Equipped with an Electrical Submersible Pump (ESP):

| Parameter/Data | Weight | Minimum number of parameters to be referenced. |
|---|---|---|
| Wellhead Temperature (WHT) | 50% | |
| Choke size | 50% | |

Injection Rate:

| Parameter/Data | Weight | Minimum number of parameters to be referenced. |
|---|---|---|
| Upstream Pressure | 33% | 2 |
| Wellhead Temperature (WHT) | 33% | |
| Choke size | 33% | |

Injection Rate for Injector Wells Equipped with an Electrical Submersible Pump ESP):

| Parameter/Data | Weight | Minimum number of parameters to be referenced. |
|---|---|---|
| Upstream Pressure | 33% | 2 |
| Wellhead Temperature (WHT) | 33% | |
| Choke size | 33% | |

Figure 3:
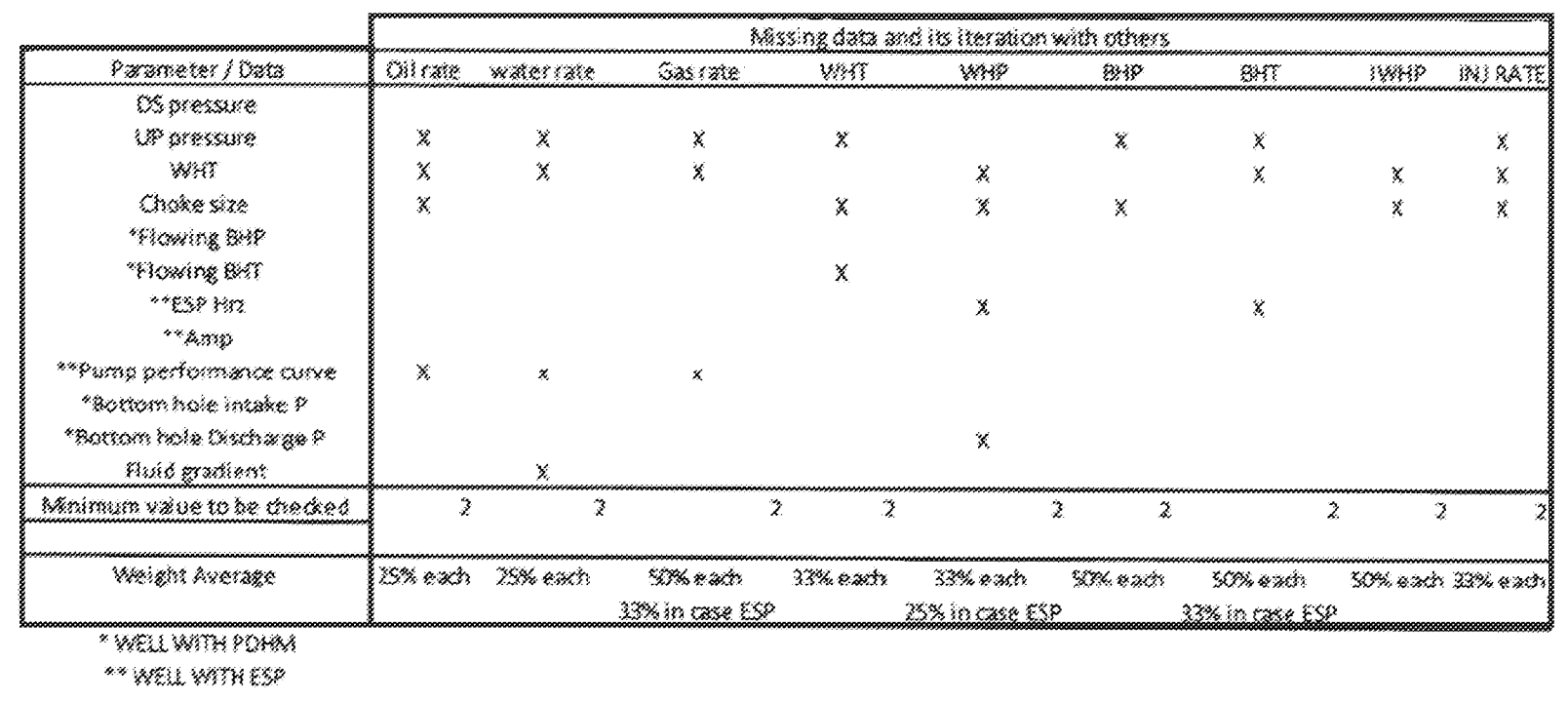

Note, the above tables are provided for illustrative purposes, additional rules, tolerances, weights, and minimum number of combinations are, however, within the scope of the present invention. FIG. 3 provides a summary of the above table parameters and weights applied when all available parameters are used.

As can be seen from the tables, according to the exemplary configuration, flow rate estimations can depend on a functional relationship between production rate parameters and in alternative configurations, flowing fluid temperature. Also choke change correlations can be applied. Additionally, surface temperature changes can be estimated using correlations and historical data. Surface pressure estimates can include the application of a correlation between bottom hole values and choke size. Bottom hole temperature and pressure estimates can include referencing surface temperature and/or pressure values. Fluid gradient, utilized, for example, in the estimation of water rate, can be estimated by applying the following equation: fg=(P2−P1)/h in wells equipped with a permanent downhole monitoring system (PDHMS), where P2=lower PDHMS, P1 shallow PDHMS, h=height. Choke size values can be estimated using a correlation between flow, pressure, and/or temperature changes.

Observation Wells:

With respect to observation wells, SWHP, SHWT, SBHP, and SBHT has been monitored. To obtain missing SWHP, SHWT, SBHP, or SBHT data values, the process or processes can include checking the pressure historical trend. If the respective value has not dropped more that 5% per month, then the trend value can be extrapolated. After data is been restored, a logarithm model can be used to back estimate the missing data.

Referring again to FIG. 2, after the estimated data values are confirmed as being reliable and valid (block 113), a real time data substitution can then be performed using the estimated data values (block 115). For example, if a portion of the data was faulty as a result of the data being unreliable or invalid, the estimated data values can directly replace the faulty data values. If the portion of the data was faulty as a result of their being gaps in the data, i.e., missing data, the estimated data values, or corresponding portions thereof, can be inserted to fill in the gaps.

A data resumption determination process performed prior to the data rectification process can be employed. For example, the data resumption process can include continued monitoring of data flow to detect when the data emanating from the faulty well instrument 40 is both reliable and valid (e.g., via WDeye and WDvalidation) and devoid of substantial gaps (block 117), and ceasing estimating data for the affected instrument once such conditions are met (block 119).

It is important to note that while the foregoing embodiments of the present invention have been described in the context of method steps which can be performed using or assisted by a fully functional computer apparatus, those skilled in the art will appreciate that the mechanism of at least portions of the present invention and/or aspects thereof are capable of being distributed in the form of a computer readable medium in a variety of forms capable of storing a set of instructions for execution on a processor, processors, or the like, and that various embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions. Such media can contain, for example, both operating instructions and the operations instructions related to program code/product 51 for managing an intelligent field along with computer implementable method steps, described above.

The appended claims may reference, include, or feature "non-transitory computer readable storage medium" language, which is understood to be a recent U.S. Patent and Trademark Office requirement, and having a meaning designed to specifically indicate that the featured computer readable medium is not a propagating signal per se which was found to be non-statutory (unpatentable) subject matter according to a recent court case. It is further understood that non-transitory computer readable storage medium includes all computer readable storage medium that does not fall under the category of being non-statutory subject matter.

This application is a non-provisional of and claims priority to and the benefit of U.S. Provisional Application No. 61/698,275, filed on Sep. 7, 2012, and is a continuation-in-part of U.S. Non-Provisional application Ser. No. 13/731,238, filed on Dec. 31, 2012, titled Real-Time Dynamic Data Validation Methods for Intelligent Fields and U.S. Non-Provisional application Ser. No. 13/731,257, filed on Dec. 31, 2012, titled "Real-Time Dynamic Data Validation Apparatus and Computer Readable Media for Intelligent Fields," which claimed priority to and the benefit of U.S. Patent App. No. 61/582,350, filed on Dec. 31, 2011, titled "Real-Time Dynamic Data Validation Methods for Intelligent Fields," and is related to U.S. Non-Provisional application Ser. No. 13/889,136, filed on May 7, 2013, titled Apparatus, Computer Readable Media, and Computer Programs For Estimating Missing Real-Time Data for Intelligent Fields, each incorporated by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A computer implemented method of managing an intelligent field, the method comprising the steps of:
    detecting faulty data from one of a plurality of well instruments for a well in an intelligent field defining a faulty well instrument;
    estimating data values in at least substantially real-time to provide as a substitute for at least portions of the faulty data associated With the faulty well instrument, the estimated data values being based upon observed substantially real-time well instrument data values of at least two other of the plurality of well instruments associated with the well in the intelligence field; and
    performing real-time dynamic data substitution responsive to the steps of detecting and estimating to thereby provide a substantially continuous stream of valid, reliable, and substantially complete well instrument data values for the faulty well instrument.

2. A method as defined in claim 1, wherein the faulty data comprises one or more of the following: unreliable data, invalid data, and data gaps defining missing data.

3. A method as defined in claim 1, wherein the step of detecting faulty data comprises detecting missing data, the method further comprising the steps of:
    detecting a resumption of a data transmission from the faulty well instrument;

determining that the resumed data is both reliable, valid, and substantially complete; and ceasing performing real-time dynamic data substitution.

4. A method as defined in claim 1, wherein the step of detecting faulty data comprises detecting missing data, wherein the step of estimating data values to provide as a substitute for the faulty data includes the step of:

applying artificial intelligence, neural network, and mathematical models to estimate the missing data.

5. A method as defined in claim 4, wherein the step of applying artificial intelligence, neural network, and mathematical models to estimate the missing data includes:

identifying trends and generating initial data values through application of the artificial intelligence model, the artificial intelligence model utilizing the observed real-time well instrument data values of the at least two other of the plurality of well instruments that directly or indirectly relate to corresponding values of the missing data;

crosschecking the generated values as well as capturing trends and conditions from data clusters for similar wells conditions through application of a neural network model; and integrating processes of the artificial intelligence model and neural network model and generating final data values through application of a statistical numerical approach to thereby generate the missing data.

6. A method as defined in claim 1, wherein the data values for the faulty well instrument comprise oil flow rate data values, and wherein the observed real-time well instrument data values of at least two other of the plurality of well instruments comprise at least two of the following: upstream pressure data, wellhead temperature data, and choke size data.

7. A method as defined in claim 1, wherein the well includes an electrical submersible pump, wherein the data values for the faulty well instrument comprise oil flow rate data values, and wherein the observed real-time well instrument data values of at least two other of the plurality of well instruments comprise at least two of the following: upstream pressure data, wellhead temperature data, choke size data, and electrical submersible pump performance data.

8. A method as defined in claim 1, wherein the data values for the faulty well instrument comprise water flow rate data values, and wherein the observed real-time well instrument data values of at least two other of the plurality of well instruments comprise at least two of the following: upstream pressure data, wellhead temperature data, and fluid gradient data.

9. A method as defined in claim 1, wherein the well includes an electrical submersible pump, wherein the data values for the faulty well instrument comprise water flow rate data values, and wherein the observed real-time well instrument data values of at least two other of the plurality of well instruments comprise at least two of the following: upstream pressure data, wellhead temperature data, fluid gradient data, and electrical submersible pump performance data.

10. A method as defined in claim 1, wherein the data values for the faulty well instrument comprise gas flow rate data values, and wherein the observed real-time well instrument data values of at least two other of the plurality of well instruments comprise upstream pressure data and wellhead temperature data.

11. A method as defined in claim 1, wherein the well includes an electrical submersible pump, Wherein the data values for the faulty well instrument comprise gas flow rate data values, and wherein the observed real-time well instrument data values of at least two other of the plurality of well instruments comprise at least two of the following: upstream pressure data, wellhead temperature data and electrical submersible pump performance data.

12. A method as defined in claim 1, wherein the data values for the faulty well instrument comprise wellhead temperature data values, and wherein the observed real-time well instrument data values of at least two other of the plurality of well instruments comprise upstream pressure data and choke size.

13. A method as defined in claim 1, wherein the well includes a permanent downhole monitoring system, Wherein the data values for the faulty well instrument comprise wellhead temperature data values, and wherein the observed real-time well instrument data values of at least two other of the plurality of well instruments comprise at least two of the following: upstream pressure data, choke size, and flowing bottom hole temperature.

14. A method as defined in claim 1, wherein the data values for the faulty well instrument comprise wellhead pressure data values, and wherein the observed real-time well instrument data values of at least two other of the plurality of well instruments comprise wellhead temperature and choke size.

15. A method as defined in claim 1, wherein the well includes a permanent downhole monitoring system, wherein the data values for the faulty well instrument comprise wellhead pressure data values, and wherein the observed real-time well instrument data values of at least two other of the plurality of well instruments comprise at least two of the following:

upstream pressure data, choke size, and flowing bottom hole temperature.

16. A method as defined in claim 1, wherein the well includes a permanent downhole monitoring system and an electrical submersible pump, wherein, the data values for the faulty well instrument comprise wellhead pressure data values, and wherein the observed real-time well instrument data values of at least two other of the plurality of well instruments comprise at least two of the following: upstream pressure data, choke size, flowing bottom hole temperature, and electrical submersible pump frequency.

17. A method as defined in claim 1, wherein the data values for the faulty well instrument comprise bottom hole pressure data values, and wherein the observed real-time well instrument data values of at least two other of the plurality of well, instruments comprise upstream pressure and choke size.

18. A method as defined in claim 1 wherein the data values for the faulty well instrument comprise bottom hole temperature data values, and wherein the observed real-time well instrument data values of at least two other of the plurality of well instruments comprise upstream pressure and wellhead temperature.

19. A method as defined in claim 1, wherein the well includes a permanent downhole monitoring system, wherein the data values for the faulty well instrument comprise bottom hole temperature data values, and wherein the observed real-time well instrument data values of at least two other of the plurality of well instruments comprise upstream pressure, wellhead temperature, and electrical submersible pump frequency.

20. A method as defined in claim 1, wherein the well is an injection well, wherein the data values for the faulty well instrument comprise injection well hole pressure data values, and Wherein the observed real-time well instrument data values of at least two other of the plurality of well instruments comprise and wellhead temperature and choke size.

21. A method as defined in claim 1, wherein the well is an injection well, wherein the data values for the faulty well instrument comprise injection rate data values, and wherein the observed real-time well instrument data values of at least two other of the plurality of well instruments comprise upstream pressure wellhead temperature, and choke size.

22. A method as defined in claim 1, further comprising the step of:
  estimating bottom hole fluid gradient responsive to real-time dynamic PDHMS pressure data from both a bottom hole PDHMS pressure measurement unit and a shallow PDHMS pressure measurement unit.

23. A computer implemented method of managing an intelligent field, the method comprising the steps of:
  receiving at least substantially real-time dynamic field data for an intelligent field system, the at least substantially real-time field data comprising a plurality of well instrument data values for each of a plurality of well instruments for a well;
  analyzing reliability, validity, and completeness of the received data for each of the well instruments;
  detecting faulty data comprising one or more of the following: missing data, invalid data, and unreliable data, for one of the plurality of well instruments defining a faulty well instrument;
  estimating data values at least substantially real-time for the faulty well instrument based upon observed substantially real-time well instrument data values of at least two other of the plurality of well instruments; and
  performing real-time dynamic data substitution responsive to the steps of detecting and estimating to thereby provide a substantially continuous stream of valid and reliable well instrument data values for the faulty well instrument.

* * * * *